United States Patent
Czerwonatis et al.

(10) Patent No.: US 9,200,129 B2
(45) Date of Patent: *Dec. 1, 2015

(54) PROCESS FOR PREPARING FOAMABLE POLYMER COMPOSITIONS, PROCESS FOR PREPARING FOAMED POLYMER COMPOSITIONS THEREFROM, FOAMED POLYMER COMPOSITIONS AND ADHESIVE TAPE THEREWITH

(75) Inventors: Franziska Czerwonatis, Hamburg (DE); Klaus Kleinhoff, Rodenburg (DE); Axel Burmeister, Buchholz (DE)

(73) Assignee: tesa SE, Hamburg (DE)

(*) Notice: Subject to any disclaimer, the term of this patent is extended or adjusted under 35 U.S.C. 154(b) by 0 days.

This patent is subject to a terminal disclaimer.

(21) Appl. No.: 13/016,197

(22) Filed: Jan. 28, 2011

(65) Prior Publication Data

US 2011/0281964 A1 Nov. 17, 2011

(30) Foreign Application Priority Data

Dec. 8, 2010 (DE) .......................... 10 2010 062 669

(51) Int. Cl.
*C08J 9/32* (2006.01)
*B29C 44/22* (2006.01)
(Continued)

(52) U.S. Cl.
CPC . *C08J 9/32* (2013.01); *B29C 44/22* (2013.01); *C08K 7/22* (2013.01); *C08J 2201/026* (2013.01); *C08J 2203/22* (2013.01); *C08K 5/0025* (2013.01)

(58) Field of Classification Search
CPC ........ B29C 44/206; C08J 9/32; C08J 2203/22
USPC ........... 264/45.4, 45.9, 53.1; 428/314.4, 45.4, 428/45.9, 53.1; 521/56, 59, 60; 523/218, 523/219
See application file for complete search history.

(56) References Cited

U.S. PATENT DOCUMENTS

| | | | |
|---|---|---|---|
| 3,565,247 A | 2/1971 | Brochman | |
| 4,513,106 A * | 4/1985 | Edgren et al. | 521/58 |

(Continued)

FOREIGN PATENT DOCUMENTS

| | | |
|---|---|---|
| DE | 21 05 877 C | 8/1972 |
| DE | 195 31 631 A1 | 3/1997 |

(Continued)

OTHER PUBLICATIONS

European Search Report Dated Mar. 22, 2013.
(Continued)

*Primary Examiner* — Melissa Rioja
(74) *Attorney, Agent, or Firm* — Norris McLaughlin & Marcus PA

(57) ABSTRACT

The invention relates to a process for preparing a foamed polymer composition using expandable hollow microbeads,
  wherein, in a first process strand, first starting materials, which include at least the predominant portion of the polymer or polymers to be used, are mixed and degassed to give a premix,
  whereafter this premix is subjected to a pressure such that the pairing of this pressure with the temperature of the premix is below the pressure and temperature pairing that is critical for triggering the expansion of the hollow microbeads to be used,
  wherein, in a second process strand, second starting materials, including the hollow microbeads to be used, are degassed,
  whereafter the second starting materials treated in the second process strand are added to the premix prepared in the first process strand,
whereafter the second starting materials are mixed with the premix.

15 Claims, 3 Drawing Sheets

(51) Int. Cl.
  *C08K 7/22* (2006.01)
  *C08K 5/00* (2006.01)

(56) References Cited

U.S. PATENT DOCUMENTS

| | | | |
|---|---|---|---|
| 5,266,402 A * | 11/1993 | Delgado et al. | 428/355 AK |
| 5,753,362 A * | 5/1998 | Kawase et al. | 428/327 |
| 6,103,152 A * | 8/2000 | Gehlsen et al. | 264/45.4 |
| 6,184,259 B1 * | 2/2001 | Peretti et al. | 521/54 |
| 6,797,371 B1 * | 9/2004 | Gehlsen et al. | 428/317.5 |
| 6,822,048 B1 * | 11/2004 | Burmeister et al. | 525/125 |
| 7,063,887 B2 * | 6/2006 | Kobe et al. | 428/317.9 |
| 7,491,434 B2 * | 2/2009 | Khandpur et al. | 428/36.5 |
| 7,879,441 B2 * | 2/2011 | Gehlsen et al. | 428/343 |
| 2004/0197545 A1 | 10/2004 | Gehlsen | |
| 2004/0241417 A1 * | 12/2004 | Fischer et al. | 428/317.9 |
| 2008/0114085 A1 * | 5/2008 | Wang | 521/59 |
| 2008/0115751 A1 | 5/2008 | Knecht et al. | |
| 2009/0030095 A1 * | 1/2009 | Laverdure et al. | 521/60 |
| 2009/0048398 A1 | 2/2009 | Zollner et al. | |
| 2009/0053447 A1 | 2/2009 | Zollner et al. | |
| 2009/0181250 A1 * | 7/2009 | Zmarsly et al. | 428/352 |
| 2010/0104864 A1 | 4/2010 | Zollner et al. | |
| 2010/0218932 A1 * | 9/2010 | Fischer et al. | 165/185 |
| 2012/0029105 A1 | 2/2012 | Czerwonatis et al. | |

FOREIGN PATENT DOCUMENTS

| | | |
|---|---|---|
| DE | 10 2008 004 388 A1 | 7/2009 |
| DE | 10 2008 059 050 | 5/2010 |
| DE | 10 2009 015 233 A1 | 10/2010 |
| EP | 0 752 435 A | 1/1997 |
| EP | 1 102 809 A1 | 5/2001 |
| EP | 1 791 921 A | 6/2007 |
| EP | 1 791 922 A | 6/2007 |
| EP | 1 802 722 A | 7/2007 |
| EP | 1 978 069 A | 10/2008 |
| WO | 00/06637 | 2/2000 |
| WO | 2002/072701 A1 | 9/2002 |
| WO | 2006/027387 A1 | 3/2006 |
| WO | 2006/027388 A1 | 3/2006 |
| WO | 2006/027389 A1 | 3/2006 |

OTHER PUBLICATIONS

German Search Report dated Aug. 2, 2011.

* cited by examiner

PROCESS FOR PREPARING FOAMABLE POLYMER COMPOSITIONS, PROCESS FOR PREPARING FOAMED POLYMER COMPOSITIONS THEREFROM, FOAMED POLYMER COMPOSITIONS AND ADHESIVE TAPE THEREWITH

The invention teaches a process for preparing a polymer composition which is foamed with expanded polymeric hollow microbeads, and a foamed polymer composition of this kind. The focus is on a foamed polymer composition—and a process for its preparation—that is viscoelastic and, with further preference, is permanently tacky. The invention further relates to an adhesive tape which comprises such a composition in a backing and/or in one or two permanently tacky layers disposed on the surface.

BACKGROUND OF THE INVENTION

One of the known ways of foaming polymer compositions is to use polymeric hollow microbeads, known as microballoons. Microballoons have their own polymer shell, inside which is a liquid which by means of a treatment step—generally by supply of heat or by generation of heat—is caused to expand into the gas phase with an accompanying softening of the polymer shell to an extent such that it is able to increase the volume it encloses. Polymers foamed with microballoons have been known for a long time and described for a long time, including in the form of permanently tacky compositions. The words "permanently tacky composition" mean the same as "self-adhesive composition" or "pressure-sensitive adhesive". The prior art includes DE 21 05 877 C, EP 1 102 809 A1 and DE 195 31 631 A1.

The known types of polymers foamed using microballoons, more particularly self-adhesive compositions, have not only the cavities generated by microballoons and often called "caverns" but also cavities which are not surrounded by their own polymer shell. The presence of caverns not surrounded by their own polymer shell has the effect, to the knowledge of the inventors, of promoting the formation of open-celled foams.

To the knowledge of the inventors, however, it would be better to have foamed polymers with caverns produced only by microballoons, since these polymers achieve a more uniform size distribution of the hollow cells, and a higher cohesion, without disadvantages in terms of adhesion. In a few applications, moreover, the higher permeation resistance to gases and liquids that is achievable by the closed-celled nature of the polymers is desirable. Moreover, such caverns without their own polymer shell tend to collapse under the influence of pressure and/or heat, and/or combine to form large bubbles.

Materials which have been foamed—as specified in publication DE 21 05 877 C, for example—not by means of microballoons, but instead in another way, are more susceptible, by contrast, to irreversible collapse under pressure and temperature. They also have a lower cohesive strength.

Polymer compositions foamed by means of microballoons exhibit the same disadvantages if too many microballoons collapse in the process. According to EP 1 102 809 A1, skilled workers expect such collapse if the microballoons expand at such an early point in time that thereafter they are exposed to considerable stresses, whether as a result of shearing or as a result of heat-induced expansion pressure. The softness of the membrane, as a consequence of the high temperatures generally prevailing in the process, and also its thinness, as a result of the stretching that is associated with the expansion, cause the membrane to tear easily, thereby releasing the blowing gas in the microballoons as an unstabilized gas bubble in the polymer foam. Consequently, premature expansion is to be suppressed.

Known from DE 195 31 631 A1 is a process in which, admittedly, the late disposition of the expansion step appears to rule out the destructive tearing of the microballoon membranes, but in which, when the granule-like microballoons and other adjuvants are incorporated, entrains air into the polymer matrix and hence once again, deleteriously, generates caverns of the kind whose boundary area is not sealed and stabilized by its own polymer shell.

It is an object of the invention to provide a foamed polymer composition—preferably a self-adhesive composition—which is free from cavities of the kind not generated by microballoons. Besides expandable microballoons, non-expandable microballoons, if any at all, hollow glass beads, for example, are to be used for achieving foaming, but free gas bubbles are to be suppressed.

A cavern originating from an expandable microballoon has a membrane-like shell comprising a polymer or polymer mixture, and which—in spite of every stretchability achieved by heating—has a higher elasticity than the surrounding polymer composition matrix at the cooler application temperatures of the completed product of the invention.

SUMMARY OF THE INVENTION

The object is achieved by means of a process for preparing a foamable polymer composition using expandable hollow microbeads, wherein, in a first process strand, first starting materials, which include at least the predominant portion of the polymer or polymers to be used, are mixed and degassed to give a premix, whereafter this premix is subjected to a pressure such that the pairing of this pressure with the temperature of the premix is below the pressure and temperature pairing that is critical for triggering the expansion of the hollow microbeads to be used, wherein, in a second process strand, second starting materials, including the hollow microbeads to be used, are degassed, whereafter the starting materials treated in the second process strand are added to the premix prepared in the first process strand, which means that the first process strand and the second process strand are combined, whereafter the second starting materials are mixed with the premix.

DETAILED DESCRIPTION

Figure 1:
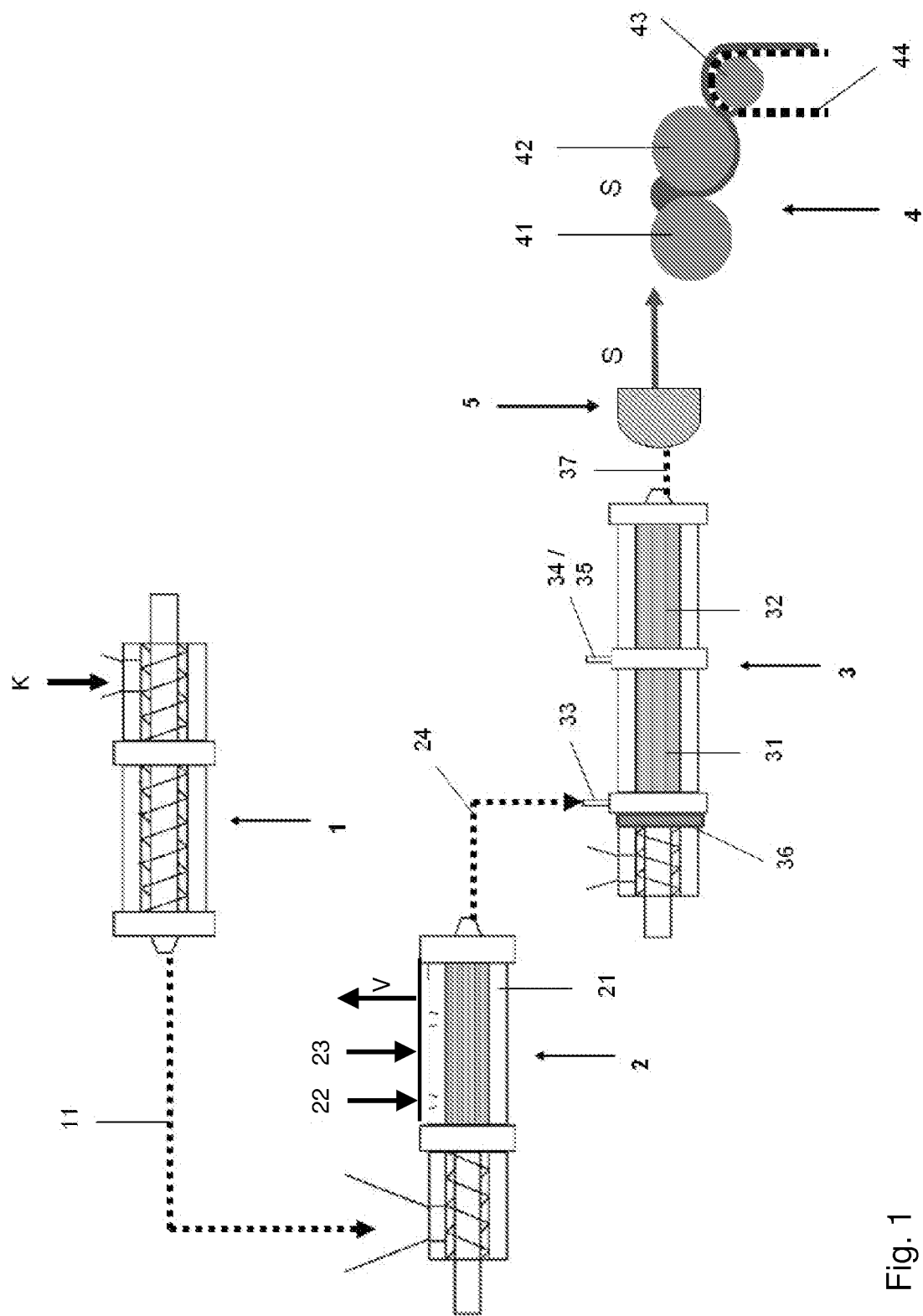
FIG. 1 illustrates an apparatus for implementing the process of the invention.

The result of the process defined so far in Claim 1 and embodied in more detail in Claims 2 to 9 is an as yet unfoamed polymer composition which contains virtually no free gas. Its particularly preferred quality lies in the fact that from this composition it is possible to foam a polymer composition which still contains an extraordinarily small amount of free gas; the achievable proportion of caverns without their own polymer shell, indeed, is below 2% by volume, and with a preferred process even below 0.5% by volume.

Microballoons are approximately spherical hollow bodies having an elastic and thermoplastic polymer shell; accordingly, they are also referred to as expandable polymeric microspheres or as hollow microbeads.

Microballoons are filled with low-boiling liquids or with liquefied gas. Shell materials used include more particularly polyacrylonitrile, polyvinyl dichloride (PVDC), polyvinyl chloride (PVC), polyamides or polyacrylates. Suitable low-boiling liquids are, more particularly, hydrocarbons of the lower alkanes, for example isobutane or isopentane, which are enclosed as liquefied gas under pressure in the polymer shell.

Action on the microballoons—more particularly by supply of heat or generation of heat, as for example by ultrasound or microwave radiation—causes, first, a softening of the outer polymer shell, while at the same time the liquid blowing gas present in the shell undergoes transitions of its gaseous state. At a particular pairing of pressure and temperature, identified for the purposes of this specification as the critical pairing, the microballoons undergo irreversible expansion, and expand three-dimensionally. The expansion is at an end when the internal pressure equals the external pressure. Since the polymeric shell is maintained, a closed-celled foam is achieved in this way.

A large number of types of microballoon are available commercially, such as, for example, from Akzo Nobel, the Expancel DU products (dry unexpanded), which differ essentially in their size (6 to 45 μm in diameter in the unexpanded state) and in the starting temperature they require for expansion (75° C. to 220° C.).

Furthermore, unexpanded types of microballoon are also available in the form of an aqueous dispersion, with a solids fraction or microballoon fraction of around 40% to 45% by weight, and also in the form of polymer-bound microballoons (masterbatches), for example in ethylene-vinyl acetate, with a microballoon concentration of around 65% by weight. Obtainable, furthermore, are what are called microballoon slurry systems, in which the microballoons are present in the form of an aqueous dispersion with a solids fraction of 60% to 80% by weight. The microballoon dispersions, the microballoon slurries, and the masterbatches, like the DU products, are suitable for the foaming of adhesives in accordance with the process of the invention.

Selected with particular preference in accordance with the invention are microballoons which in the unexpanded state—at 25° C.—have a diameter of 3 μm to 40 μm, more particularly 5 μm to 20 μm, and/or after expansion have a diameter of 10 μm to 200 μm, more particularly 15 μm to 90 μm.

As a result of their flexible, thermoplastic polymer shell, foams produced in accordance with the invention possess a higher gap-bridging capacity than those filled with non-expandable, non-polymeric hollow microbeads (such as hollow glass or ceramic beads). Consequently they are more suitable for the compensation of manufacturing tolerances, of the kind that occur, for example, with injection-moulded parts. Furthermore, a foam of this kind is better able to compensate thermal stresses.

Thus, for example, through the selection of the thermoplastic resin of the polymer shell, it is possible to exert further influence over the mechanical properties of the foam. Hence it is possible, for example, to produce foams having a higher cohesive strength than with the polymer matrix alone, despite the fact that the foam has a lower density than the matrix. Furthermore, typical foam properties, such as conformability to uneven substrates, can be combined with a high cohesive strength for PSA foams.

With preference, up to 30% by weight of microballoons, more particularly between 0.5% by weight and 10% by weight, based on the total formula of the polymer composition without microballoons, are added for the purpose of foaming to the polymer composition that is to be foamed.

A first aspect of the invention is concerned with the degassing of the starting materials for preparing the foamed polymer composition by means of the process of the invention.

A polymer composition of the invention, comprising expandable hollow microbeads, may additionally contain non-expandable hollow microbeads as well. The only decisive factor is that virtually all gas-containing caverns are closed by a durably coherent membrane, irrespective of whether this membrane is composed of an elastically and thermoplastically stretchable polymer mixture or, for instance, of glass which is elastic and—within the spectrum of the temperatures possible in the processing of plastics—non-thermoplastic.

The designation "virtually gas-free" circumscribes, for the purposes of this application, not only a state of a mixture in which that mixture, in the hard mathematical sense, contains not a single molecule of a substance which is present in gaseous form at the maximum temperature prevailing in the operation (generally 90 to 140° C., 230° C. at most); instead, it is sufficient for the concentration of these gaseous substances to be so low that they dissolve in the mixture, without forming caverns of free air.

The quality of being "substantially gas-free" on the part of the foamed polymer composition obtainable in accordance with the invention means that the volume fraction of free gases—that is, gases not dissolved in the polymer composition—such as air, in particular, under standard conditions is to be extremely low. The fraction of free, i.e. undissolved, gases in the foamed polymer composition—more particularly in the form of open-celled caverns—ought preferably not to exceed a fraction of 2% by volume, preferably of 0.5% by volume (based in each case on the foamed polymer composition).

The degassing in the context of the process of the invention is carried out with particular advantage such that it leads to this virtually gas-free state. More particularly, the degassed starting materials, after degassing, are virtually gas-free in all stages of the process, and, with further advantage, the foamed polymer composition prepared is virtually gas-free for all intended application conditions.

As a result of the process regime of at least two process strands it is possible first of all to carry out mixing of starting materials which are not particularly susceptible to shearing and to degas them jointly in the mixing assembly—or in a further assembly. Process strands in the context of the specification is the term used for process pathways which can be taken independently of one another. The temperature for the mixing of the components is advantageously selected at a level—for example at least 50° C., generally 90 to 140° C., 230° C. at most—such that at least the main component, generally a polymer, is softened (with particular advantage, is present in melted form) to such an extent that there is effective mixing of the components with one another in the mixing assembly. In a second process strand, at any desired point in time, the second starting materials are degassed. These second starting materials may be degassed individually, in groups or jointly. Second starting materials are at least the expandable hollow microbeads. The second starting materials degassed in the second process strand may be confined to hollow microbeads, but also encompass further substances, such as other granulate-form substances, substances which are not to be added right from the start, such as, for example, crosslinker systems or parts thereof—more particularly crosslinkers and/or accelerants—and/or resins.

If substances which do not belong to the first, jointly degassed starting materials, individually or in groups, are degassed independently of the second starting materials, in other words at least the hollow microbeads, then these starting materials or groups may also be added to the premix separately from the second starting materials, and thus form further process strands; addition to the premix in this case may take place in each case after or, preferably, before the addition of the microballoons, and so preferably the microballoons (together with the dispersing assistants and/or other starting materials that are possibly to be added jointly with them) are added.

With regard to the merging ("confluence") of the second and any further process strands with the first process strand, the temperature in the mixing assembly ought in turn to be selected such that the mixture of the first starting materials is sufficiently soft (present in the form of a melt mixture, for example) that effective mixing with the starting materials supplied can take place.

Those constituents of the mixture which are in granule form are preferably embedded into a dispersing assistant before they are added to the mixture. This is the case in particular for all granule-like mixture constituents which are added to the mixture at a point in time after which there is no longer any degassing of the mixture. It may, however, also be advantageous for granular constituents which are added to the premix at a point in time after which degassing of the mixture still takes place to be embedded, for the purpose of their addition to the mixture, into a dispersing assistant, more particularly into a degassed dispersing assistant.

Where, in the context of this specification, with regard to the mixed starting materials, the term "mixture" is used, this term encompasses the starting materials that have already been mixed, in other words, for instance, the premix before addition of further starting materials, the mixed starting materials after addition of the second starting materials to the premix, and also after addition of any further starting materials, and therefore does not place any further restriction on location or time in the process, unless otherwise indicated or otherwise apparent from the context.

Granules for the purposes of this specification are accumulations of macroscopic particles, the term "macroscopic" being understood in the physical sense, in other words describing those particles which obey the laws of classical physics. The macroscopic particles are also referred to below as "grain" or as "granules". Granules may be individual particles or else aggregates of two or more particles.

The term "granular", accordingly, identifies those materials which take the form of an accumulation of macroscopic particles.

Dispersing assistants are those substances whose viscosity is sufficiently low to allow the granules to be embedded virtually gas-free. For the purposes of this specification, on account of this viscosity requirement, the term "liquid" is used synonymously for the dispersing assistants, and substances which below the activation temperature of the hollow microbeads have a sufficient fluidity for virtually gas-free embedding of these substances are encompassed by this definition. They also include substances which are liquefied at a temperature below the activation energy of the microballoons, and are present as solid substances at even lower temperatures, such as at room temperature, for example. The liquid is advantageously selected such that it is suitable even at lower temperatures, more particularly at room temperature, for effecting virtually gas-free embedding of the granular substances.

Embedment into a dispersing assistant prevents air flowing again into the interstices that otherwise exist between the granules, at the moment of addition to the mixture. As a result of the embedment—dispersing—of the granular constituents of the mixture, more particularly the microballoons, but also additives such as beads, chalk, dusts and the like, into a liquid, and more particularly their addition to the polymer composition in the state in which they are embedded into the liquid, therefore, it is possible to prevent unwanted gases such as air or the like being carried into the polymer composition.

The dispersing assistants are selected more particularly such that, under the conditions of the process, they do not lead to unintended open-celled cavern formation in the polymer composition, more particularly do not tend toward gas formation in the polymer composition, and hence do not give rise to renewed formation of gas bubbles. The dispersing assistant is therefore selected more particularly such that it does not evaporate at any pressure and temperature pairing occurring after the confluence of the second process strand with the first process strand. One of the ways in which this can be achieved, in particular, is by selecting the amounts of dispersant such that the dispersant is present in dispersed and/or dissolved form fully in the polymer composition under all process conditions, and does not produce gas. Furthermore, the dispersing assistants ought to be selected such that they do not attack, let alone destroy the thermoplastic polymer shell of the microballoons.

Degassed advantageously is the dispersing assistant even before the embedding of the granules, more particularly the dispersing assistant for the embedding of the hollow microbeads. A procedure may also be adopted in which the dispersing assistant is degassed jointly with the embedded granular constituents. Where the hollow microbeads are to be degassed jointly with the dispersing assistant, care should be taken to ensure that the degassing conditions (especially pressure and temperature) are selected such that the degassing does not cause any expansion of the hollow microbeads.

Advantageous dispersing assistants are, for example, organic compounds which boil only at a high temperature and, preferably, are of low flammability and/or low combustibility, examples being liquid resins, oils, plasticizers—such as phosphoric esters, adipic esters, citric esters, oleic acid or other long-chain alkanoic acids, or low-viscosity polyacrylates—ethoxylated tertiary amines with alkane radicals having more than 11 carbon atoms and two or more ethylene oxide units in the molecule.

Water as well—if, in addition to the condition of sufficiently small dose even before departure from the mixing apparatus, the temperature is below 100° C.—may be used as dispersing assistant.

In one advantageous procedure, the degassing at least of part of the mixture constituents which are granular, more particularly of all such mixture constituents, takes place together with or after these constituents have been embedded into the liquid. The degassing of the remaining portion of such mixture constituents, or of all such mixture constituents, may be brought about by the embedment into the liquid—specifically, by displacement of the gases to be removed (more particularly air), in particular, in the interstices between the granules, by the incoming liquid, and their escape therefrom. Alternatively or additionally, degassing of the dispersants provided with the granular additives may be envisaged. As already observed, in the case of embedded microballoons, care must then be taken to ensure that they do not expand actually during degassing.

As is known per se, degassing is achieved in particular in a reduced-pressure zone whose internal pressure is called p2 below. Within the bounds of economic feasibility, a complete vacuum would produce the quickest and strongest degassing; in practice, however, a pressure gradient of 0.8 bar to the otherwise ambient pressure, which can be produced inexpensively and/or is more easy to realize technically, may be sufficient, particularly the higher a pressure p1 attained beforehand was.

Advantageously, all of the constituents of the mixture may be degassed even before they are added to the mixture. Where the degassing of all of the mixture constituents is carried out prior to their addition to the mixture, and the entrainment of air during addition to the mixture (and also thereafter) is prevented, it is possible to do without degassing of the mixture after all of the components have been added.

The degassing of the mixture already blended with microballoons would harbour a risk of premature expansion and destruction of the microballoons. It is therefore advantageous if the microballoons and the other constituents of the mixture (the latter either separately or as a joint component) are degassed separately, rather than the polymer component with the microballoons already added.

If the mixing apparatus used is an extruder, the addition of an already degassed component at the start of the extruder, without entrainment of new air, may be accomplished by pressing this component into the inlet screw of the extruder in the form of a strand such that the space between two adjacent screw turns is just completely filled. The addition of an already degassed component at a later point in the extruder, where the components already introduced into the extruder beforehand are already degassed, and are preferably already under a pressure of more than 8 bar, is particularly uncomplicated; it requires that the pressure with which the already degassed component is supplied at the later point in the extruder be higher than the pressure in the extruder at said supply point.

A further aspect of the invention relates to the suppression of the expandable hollow microbeads in the mixing assembly or mixing assemblies and, where present, in a downstream die as well, preferably. The entirety of the mixing assemblies is also referred to in the context of the specification as mixing apparatus. The expansion of the hollow microbeads is suppressed by subjecting the premix resulting from the mixing of the first starting materials to a pressure such that the pairing of this pressure with the temperature of the premix is below the pressure and temperature pairing that is critical for triggering the expansion of the hollow microbeads to be used. A pairing of this kind lying below the pressure and temperature pairing that is critical for triggering the expansion of the hollow microbeads to be used is referred to below as a subcritical pressure and temperature pairing. The starting materials treated in the second process strand are added to the premix prepared in the first process strand at the subcritical, i.e., expansion-suppressing, pressure and temperature pairing that is present following the pressure exposure.

In an advantageous procedure, the process is performed such that, after the second process strand has merged into the first process strand, a subcritical pressure-temperature pairing remains maintained at least until a homogeneous distribution of the further starting materials into the premix has been achieved. This may advantageously, but need not necessarily, be the pairing that prevails on addition of the microballoons, and said pressure and/or temperature may deviate from the values chosen above, provided that the conditions overall are still subcritical.

Mixing may be carried out in a mixing assembly or in two or more mixing assemblies, and downstream of the chain of assemblies there may also, optionally, be a die—for example, a slot die for the preliminary shaping of the emerging polymer composition.

In a very preferred procedure, the expansion of the hollow microbeads commences only on departure from the mixing apparatus, in other words after departure from the last mixing assembly of the chain, or, if present, from the die. For this purpose, a subcritical pressure and temperature pairing is maintained up to the point at which the polymer composition departs from this mixing apparatus or from the die, respectively. This as well may advantageously, but need not necessarily, be one of the previously selected pairings of pressure and temperature, and so pressure and/or temperature may deviate from the values selected above, provided the conditions overall are still subcritical.

Very advantageously, the temperature of the subcritical—that is, expansion-suppressing—pairing of pressure and temperature on the addition of the microballoons, but in particular directly prior to departure from the mixing apparatus or from the downstream die, is selected such that the pairing of standard pressure (101325 Pa) with this temperature is above the pressure and temperature pairing that is critical for triggering the expansion of the hollow microbeads to be used, and so, immediately after departure from the mixing apparatus or from the downstream die—and hence on entry into the standard pressure—the expansion process begins.

The process is carried out more particularly such that, following departure from the last mixing assembly and following departure from any downstream die, there is complete expansion of the microballoons, and the foamed polymer composition is shaped. By substantially complete expansion is meant that, after shaping, there is no further expansion of the hollow microbeads under standard conditions (25° C.; 101325 Pa).

The result of the aforementioned operational regime, in other words the foaming on departure from all of the assemblies, is that the expansion of the microballoons can proceed largely without shearing, something which would not be possible either on expansion in mixing assemblies such as extruders or in a die. Exit from the die is accompanied by low-shear, more particularly shear-free, cooling of the polymer composition. As a result of the aforementioned effects, the microballoon shells, which are soft at the prevailing temperature, are reserved from mechanical stresses, thereby allowing the objective to be achieved of a maximum number of closed caverns and hence of undestroyed microballoons.

Following the complete expansion of the microballoons, the polymer composition, optionally preformed in the die, is conveyed into a roll applicator mechanism, more particularly into a multiroll calender, and in particular is placed onto a carrier material or inserted between two carrier materials. Treatment in the roll mill may be carried out such that there is a further cooling of the polymer composition in the course of the treatment.

For the shaping of the layer it is appropriate to use in each case temporary carrier materials—known as releases—which can easily be removed again for application or relamination of the resultant layers. Alternatively, shaping may take place onto a permanent carrier, between two layers intended for permanent remanence (e.g., layers of self-adhesive composition) or between one permanent layer and one layer provided temporarily. This roll applicator mechanism preferably implements the ultimate shaping of the resultant layer of the foamed polymer composition product. Through the use of roller applicator mechanisms of this kind it is possible to realize systems that are foamed after exit from the mixing chain and have very low surface roughnesses.

The foamed and shaped polymer composition has a smooth surface, since the expanded microballoons, during coating in the roll nip, are subsequently pressed back into the polymer matrix, and consequently it has a preferred surface roughness $R_a$ of less than or equal to 20 µm, very preferably less than or equal to 10 µm.

In summary, therefore, the invention relates in particular to a process in which, in at least one mixing assembly, a mixture is prepared which comprises a polymer composition and expandable polymeric hollow microbeads, and in which the polymer composition is foamed by expansion of the hollow microbeads, where the mixture is present in degassed state no later than before the step of expansion of the hollow microbeads, the expansion of the hollow microbeads is suppressed before departure from the last mixing assembly.

With particular preference in a main strand, all of the first starting materials of the first process strand—that is, in particular, polymers, tack-boosting resins, non-expandable fillers, slow crosslinking agents—with the exception of the microballoons and possibly all or some of the—more particularly more reactive, in other words, generally, more rapidly reacting—crosslinking agents, or portions thereof, and optionally further components, are added to the mixing assembly, more particularly an extruder, already at its initial feed opening, are mixed at a pressure p1, are degassed in a zone of reduced pressure p2—achievable, for example, by extending the outer barrel and attaching an evacuation pump, and then are placed under pressure again—for example, by increasing the diameter or increasing the thickness of the screw and/or screw helix (helices) and/or by installing a blister or a kneading zone, this pressure being referred to below as p3, meanwhile, in a second supply strand, the microballoons and possibly all or some—more particularly reactive, in other words, in general, rapidly reacting—crosslinking agents, or portions thereof, are incorporated without gas bubbles into a liquid and are placed under a pressure p4 which is higher than p3, before thereafter the second supply strand is merged into the main strand and then, owing to the high pressure in the unified strand, to prevent the expansion of the microballoons in spite of heating, with avoidance of the formation of caverns of the kind whose shell surface is not strengthened and sealed off by its own polymer layer, originating from the microballoons.

Finally, the pressure reduction on departure from the die at the end of the extruded chain brings about the expansion of the microballoons.

The foamed extrudate obtained in accordance with the invention is free from detrimental cavities and is shaped in the form of a web on a carrier by means of a two-roll or multiroll applicator mechanism.

The process of the invention is outstandingly suitable for the foaming of polymer compositions and leads to the successful outcome that the foamed compositions contain exclusively caverns of the kind produced by microballoons, in other words having their own polymer shell. For closed-celled foams of this kind, in comparison to open-celled versions, improved sealing of sensitive products with respect to dust and liquid media is obtained, and also a greater strength in relation to the density.

With the process of the invention it is possible outstandingly to effect foaming of, as the base polymer composition, homopolymer compositions, copolymer compositions, mixtures of homopolymers and/or copolymers, and to do so in each case with the polymer composition in pure form or blended with other components. Thus, for example, polyacrylates and/or polymethacrylates and/or polyacrylate/polymethacrylate copolymers, natural rubbers, synthetic rubbers, polyurethanes, polyolefins, polyesters, styrene block copolymers, styrene-butadiene rubbers, ethylene-vinyl acetate copolymers, silicones and/or mixtures of the aforementioned polymers may be foamed, this enumeration being exemplary and nonexhaustive.

Foamed with particular preference by the process of the invention are polymer compositions based on polymers whose predominant part amounts to a weight-average molecular weight $M_w$ of at least 250 000 g/mol. With further preference the weight-average molecular weight amounts to more than 500 000 g/mol, more preferably more than 600 000 g/mol, very preferably more than 700 000 g/mol. It is preferred to foam polymer compositions in which all of the polymer components used in the polymer composition—with the exception of any resins added—are situated within this molecular weight range (the microballoon shells, crosslinkers or accelerants or the like are not counted among the polymer components). With further preference, in conjunction with the stated weight-average molecular weights or else independently thereof, the polymers processed in accordance with the invention and forming the basis for the polymer composition have, predominantly or preferably exclusively, a number-average molecular weight $M_n$ of more than 50 000 g/mol, preferably more than 60 000 g/mol, very preferably more than 70 000 g/mol (again with the exception of optionally added resins, microballoon shells, and the aforementioned further components).

The aforesaid molecular weights ($M_w$ and $M_n$) are especially advantageous when the polymers on which the polymer composition is based are polyacrylates.

In the case of styrene block copolymers and other block copolymers and copolymers forming physical networks, it is also possible to outstanding effect to make use of those polymers having relatively low molecular weights, as for example having weight-average molecular weights of 75 000 g/mol or more, and/or having number-average molecular weights of 10 000 g/mol or more.

The microballoons are added to the base polymer composition for foaming, as are also, usually, crosslinkers, if the product ultimately present from the resultant foam is to be in crosslinked form.

The process of the invention is outstandingly suitable for producing adhesives, more particularly self-adhesive compositions—the latter also being referred to as pressure-sensitive adhesives. Self-adhesive compositions are those adhesives which at room temperature are permanently tacky. Self-adhesive products (i.e., products furnished with self-adhesive compositions, such as self-adhesive tapes and the like) exhibit viscoelastic properties and adhere to the majority of surfaces upon application just of gentle pressure; no activation by moistening or warming is necessary.

Furthermore, the process of the invention is highly suitable for producing foamed—especially viscoelastic—polymer layers which may be used to outstanding effect, for example, as carrier layers for single-sided or double-sided adhesive tapes. For this purpose, these foamed polymer layers are furnished on one or both sides with layers of adhesive, more particularly with layers of self-adhesive composition. The layers of (self-)adhesive (composition) may be coated onto the carrier layer, for example, or laminated thereto. The foamed viscoelastic carrier layers may be of either self-adhesive or nontacky embodiment.

Foamed carrier layers can also be used for what are called "seal tapes", by being coated on one side or on both sides with a polymer composition which in particular is of low tack or nontacky at room temperature, said polymer composition being activated and becoming tacky when heat energy is supplied; these are called heat-activatable adhesives. Heat-activatable adhesives develop the adhesive properties necessary for the end application to a sufficient extent only on the supply of thermal energy. Heat-activatable adhesives which can be used include thermoplastic, heat-activatable adhesives—hotmelt adhesives; usually solvent-free adhesives which only under hot conditions develop sufficient fluidity to develop sufficient (self-)adhesive forces—and/or reactive, heat-activatable adhesives—on supply of heat, a chemical reaction takes place, the adhesive sets chemically and so produces the adhesive effect. If the seal tapes are provided on one side with a heat-activatable adhesive layer, then the carrier layer itself may be of self-adhesive design, and so the second seal-tape side has self-adhesive properties. In the case of at least three-layer seal tapes with an internal foamed carrier and also with at least one heat-activatable adhesive layer on one of the seal-tape sides, the second side may carry, for example, a further heat-activatable adhesive or a pressure-sensitive adhesive.

For seal tapes of this kind, the carrier layers and any self-adhesive compositions present ought to have sufficient temperature resistance to withstand intact the activation temperature for the heat-activatable adhesive or adhesives.

The foamed layers of self-adhesive composition and/or the foamed carrier layers offer the advantage that they can be produced in a large thickness range—among others, even very thick layers can be realized—and have pressure- and impact-absorbing—damping—properties and/or roughness-compensating properties. Self-adhesive tapes with one or more layers of self-adhesive composition foamed in this way and/or with a carrier layer foamed in this way are also very suitable for impact-damping tasks, as for example for adhesive bonding in devices with fragile components such as windows. From them it is also possible to produce good—preferably self-adhesive—sealing tapes, also known as "seal tapes".

Thus it is possible to produce foamed layers of polymer composition in a range of up to several millimeters, more particularly in the range from 20 µm to 5000 µm. Preferred layers of polymer composition produced in accordance with the invention have a thickness of 50 µm to 3000 µm, more preferably of 400 µm to 2100 µm.

A further advantage of the foamed layers of self-adhesive composition and/or foamed carrier layers is their outstanding low-temperature impact resistance.

The weights per unit volume (unadjusted densities) of foamed polymer compositions prepared in accordance with the invention are situated preferably in the range between 150 and 950 kg/m$^3$, more preferably between 350 and 820 kg/m$^3$.

With the selected shaping method in the roll applicator mechanism it is possible to go below the closest spherical packing of the expanded hollow microbeads in the layer of polymer composition, since the roll pressure when shaping the foamed layer can be selected such that the hollow microbeads are deformed into polyhedra.

Adhesive tapes of the invention may take any of the following forms:
- single-layer, double-sidedly self-adhesive tapes—know as "transfer tapes"—comprising a single layer of a foamed self-adhesive composition
- single-sidedly self-adhesively furnished adhesive tapes—"single-sided self-adhesive tapes" hereinafter—where the layer of self-adhesive composition is a foamed polymer composition of the above-designated type, examples being two-layer systems comprising a foamed self-adhesive composition and an unfoamed self-adhesive composition or a heat-activatable adhesive or a foamed or unfoamed carrier layer,
- single-sidedly self-adhesive tapes in which the carrier layer is a foamed polymer layer of the above-designated type,
- double-sidedly self-adhesively furnished adhesive tapes—"double-sided self-adhesive tapes" below—in which one, more particularly both, layer(s) of self-adhesive composition is (are) a foamed polymer composition of the above-designated type, and/or where the carrier layer is a foamed polymer layer of the above-designated type,
- double-sided adhesive tapes having a heat-activatable adhesive layer on one of the adhesive-tape sides and a layer of self-adhesive composition on the other adhesive-tape side, where the carrier layer and/or the layer of self-adhesive composition is a foamed polymer composition of the above-designated kind,
- double-sided adhesive tapes having a heat-activatable adhesive layer on both adhesive-tape sides, where the carrier layer is a foamed polymer composition of the above-designated type.

The double-sided products here, irrespective of whether they are intended for adhesive bonding or for sealing, may have a symmetrical or asymmetrical construction.

Examples of single-layer adhesive tapes ("transfer tapes") are 30 µm, 50 µm, 70 µm, 100 µm, 120 µm, 400 µm, 800 µm and 1200 µm thick; examples of three-layer adhesive tapes are 100 µm, 1100 µm, 1600 µm and 2100 µm thick (more particularly with double-sided layer of self-adhesive composition, and with foamed polymer carrier).

The polymer compositions prepared in accordance with the invention are advantageously crosslinked, in order to provide sufficient cohesion. It is therefore advantageous to add crosslinkers and optionally accelerants and/or inhibitors (retardants) to the polymer composition. Below, the components that are added for initiation and for control, such as crosslinkers and accelerants, are also referred to jointly as "crosslinking system".

Suitable crosslinking methods include radiation-initiated crosslinking methods—more particularly by actinic or ionizing radiation such as electron beams and/or ultraviolet radiation—and/or thermally initiated crosslinking methods, the latter also being taken to include the systems where the activation energy can be overcome even at room temperature or below without additional application of radiation, such as actinic or ionizing radiation.

Radiation-initiated crosslinking may be obtained by a conventional procedure, more particularly by bombardment with electron beams and/or with UV radiation. For this purpose, advantageously, corresponding radiation-activatable crosslinkers are added to the polymer composition that is to be crosslinked.

In order to obtain a uniform surface on both sides in the case of layers—particularly in the case of carrier layers or double-sidedly adhesively furnished adhesive tapes, such as self-adhesive tapes or heat-activatably bonding adhesive tapes, or in the case of viscoelastic carrier layers—it is possible to adopt a procedure in which these products are irradiated on both sides, more particularly under the same conditions.

In the case of crosslinking with electron beams, use is made advantageously of typical irradiation apparatus, such as linear cathode systems, scanner systems or segmented cathode systems, in each case configured as electron beam accelerators. Typical acceleration voltages are situated in the range between 50 kV and 500 kV, preferably 80 kV and 300 kV. The scattered doses employed range, for example, between 5 to 150 kGy, more particularly between 20 and 100 kGy. For this purpose the common crosslinking substances (electron beam crosslinkers) may be added to the polymer composition.

Particular preference is given to irradiation with exclusion of air through inertization with nitrogen or noble gases or through double-sided lining with release materials, such as release-furnished films.

For optional crosslinking with UV light, UV-absorbing photoinitiators, and more particularly compounds of the kind which react to UV activation by forming free radicals, are added to the acrylate-containing PSAs.

Outstandingly suitable UV photoinitiators are those compounds which on UV irradiation exhibit a photofragmentation reaction (more particularly a cleavage in a position $\alpha$ to a photochemically excitable functional group). Photoinitiators of this kind are those of the Norrish I type. Further outstandingly suitable photoinitiators are those compounds which on UV irradiation react with an intermolecular hydrogen abstraction, triggered by a photochemically excited functional group, more particularly in $\gamma$ position. Photoinitiators of this kind are counted among the Norrish II type. It may be advantageous, furthermore, to use copolymerizable photoinitiators, by incorporating, into the polymer to be crosslinked, by copolymerization, monomers having functional groups which are able to initiate crosslinking reactions as a result of activation with UV rays.

It can be of advantage if the polymer compositions are crosslinked not by means of actinic and/or ionizing radiation. In these cases, the crosslinking may be carried out in the absence of UV crosslinkers and/or of electron beam crosslinkers, and so the products obtained also do not have any UV crosslinkers and/or any EBC crosslinkers and/or reaction products thereof.

The self-adhesive products display particularly advantageous properties if the polymer composition surrounding the hollow bodies is homogeneously crosslinked. Although thick layers are not very easily crosslinked homogeneously via the conventional electron beam or UV ray treatment, owing to the rapid decrease in radiation intensity over the depth of penetration, thermal crosslinking nevertheless provides sufficient remedy to this. In the production of particularly thick layers foamed in accordance with the invention, more particularly those which are more than 150 μm thick, therefore, it is particularly advantageous if the polymer composition to be foamed is admixed with a thermal crosslinker system. In that case, of course, initially, in the sense of a particularly stable and error-tolerant process regime, preference should be given to a system whose activation temperature is below the highest temperature that occurs in the mixing operation, or, conversely, the mixing operation should be cooled so that the activation temperature is not attained in this operation.

The more precisely it is possible to manage all of the parameters in the mixing operation, in other words, in particular, all relevant local pressures, temperatures, rotational speed, metering operations, and viscosities, the closer the operating temperature may be allowed to come to the activation temperature—a temperature increase of this kind not only lowers the cooling performance requirement and the associated costs, but also allows a more rapid process regime, in other words a more favourable balance between throughput and mixer size—and, if a sufficiently slow activation system is selected, there may even be attainment of a temperature slightly above the activation temperature at the end of the mixing operation, as the inventors have recognized. The slowness of the activation system that is necessary for this to be the case is achieved preferably through the antagonistic use of accelerants and retardants. Said antagonism results in the formation of a flattening in a region of the plot of the degree of crosslinking against the time of exposure to the elevated temperature, and hence provides, as an alternative to the attainment of a temperature below the activation temperature in the mixing operation, the required remainder of tolerance insensitivity in the process regime.

Suitable crosslinkers, particularly for polyacrylates, include isocyanates, more particularly trimerized isocyanates and/or sterically hindered isocyanates that are free of blocking agents, or else epoxide compounds such as epoxide-amine crosslinker systems; in both cases, functional groups should be present in the polymer macromolecules that are able to react with isocyanate groups or with epoxide groups, respectively.

In order to attenuate the reactivity of the isocyanates and to extend the potlife during extrusion, it is possible advantageously to use isocyanates blocked with functional groups that can be eliminated thermally. For blocking it is preferred to use, for example, aliphatic primary and secondary alcohols, phenol derivatives, aliphatic primary and secondary amines, lactams, lactones, and malonic esters.

Where epoxide-amine systems are used as crosslinker systems, the amines can be converted into their salts in order to ensure an increase in the potlife. In that case, volatile organic acids (formic acid, acetic acid) or volatile mineral acids (hydrochloric acid, derivatives of carbonic acid) are preferred for salt formation.

Advantageous crosslinker systems and suitable methods for allowing processing of the polymer composition in the melt with such crosslinkers are described in, for example, the specifications EP 0 752 435 A, EP 1 802 722 A, EP 1 791 921 A, EP 1 791 922 A, EP 1 978 069 A, and DE 10 2008 059 050 A. The relevant disclosure content is therefore explicitly incorporated into the disclosure content of the present specification. The crosslinker or, in the case of crosslinker systems, at least one constituent of the crosslinker system (for example, either the crosslinker or the accelerant) is added to the melt only at a late stage and is immediately mixed in very homogeneously (by efficient mixing, as for example in an extruder), in order to make the residence time of the reactive system in the polymer melt very short and therefore the processing life ("potlife") as long as possible. The major part of the crosslinking reaction takes place only after the shaping of the foamed polymer, more particularly after its shaping to a layer, and preferably at room temperature. As a result of this procedure it is possible to optimize two process aspects with respect to one another: namely, first, a minimal crosslinking reaction prior to shaping, in order largely to prevent unwanted and uncontrolled premature crosslinking and the corresponding gelling (formation of regions of relatively high crosslinking—gel specks, for example—within the polymer melt), while, second, having a very high mixing efficiency of the crosslinker or crosslinker system components in the relatively short residence time in the polymer melt prior to coating, in order actually to guarantee a very homogeneously crosslinked end product.

The use of the thermal crosslinkers or thermal crosslinker systems is especially advantageous for foamed polymer compositions when, as a result of the caverns, the penetration of actinic radiation (such as UV radiation, for example) into the layer is hindered. As a result of the phase transitions at the cavern shells there are refraction effects and scattering effects, and so the inner regions of the layer cannot be reached by the radiation, or can be reached only to a strongly reduced extent, and this effect is superimposed on the aforementioned effect of a depth of penetration which is limited per se. Here, the thermal crosslinking of foamed polymer compositions is of advantage particularly for achieving a homogeneously crosslinked polymer matrix.

The foaming of the expandable microballoons takes place at elevated temperatures, and this, like the processing of the polymers in the melt, is a problem for thermal crosslinkers. The choice of the aforementioned, relatively slow-to-react crosslinkers, and the choice of the aforementioned crosslinker-accelerant systems for regulating the kinetics of the crosslinking reaction, are therefore especially advantageous in each case for the foaming process that is described in the context of this specification, since these crosslinkers are capable of withstanding the corresponding temperatures, particularly in the course of foaming.

With the foaming process of the invention, foaming is suppressed prior to departure from the final mixing assembly. As a result of this, expanded microballoons are present on the surface of the foamed polymer composition. Through the use of a roll mill, more particularly a calender, for the shaping of the polymer composition, it is possible nevertheless to generate layers having a very low surface roughness. For this purpose, however, it is necessary for the polymer composition in the course of shaping to be sufficiently processable (and to have a sufficiently low level of premature crosslinking) that shaping can take place sustainably in the roll mill. For the foaming process of the invention, therefore, it is especially advantageous to use crosslinker-accelerant systems, since, as outlined earlier on above, this allows the kinetics of the crosslinking reaction to be decoupled from the degree of crosslinking, and hence a sufficiently long processing life is ensured for the foamed polymer composition to be crosslinked.

Having been found particularly preferable for the process of the invention is a crosslinker-accelerant system, more particularly for the crosslinking of polymers, more particularly of polyacrylates, having functional groups which are suitable for entering into linking reactions with epoxide groups, comprising at least one epoxide-group-containing substance as crosslinker and, as accelerant, at least one substance which has an accelerating effect on the linking reaction at a temperature below the melting temperature of the polyacrylate. Examples of suitable epoxide-group-containing substances include polyfunctional epoxides, more particularly bifunctional or trifunctional epoxides (i.e., epoxides having two or three epoxide groups, respectively), but also epoxides of higher functionality, or mixtures of epoxides with different functionalities. As accelerants it is preferred to use amines (to be interpreted formally as substitution products of ammonia), examples being primary and/or secondary amines; more particularly, tertiary and/or polyfunctional amines are used. Use may also be made of amines of the kind having two or more amine groups, these amine groups being able to be primary and/or secondary and/or tertiary amine groups; more particularly, diamines, triamines and/or tetramines. A selection is made in particular of those amines which enter into no reactions or only slight reactions with the polymer units. As accelerants it is additionally possible, for example, to use those based on phosphorus, such as phosphines and/or phosphonium compounds.

By means of this process it is possible in particular to carry out foaming and crosslinking of polymers based on acrylic esters and/or methacrylic esters, and advantageously at least some of the esters contain the functional groups, and/or comonomers are present which contain the functional groups. Suitable functional groups of the polymer to be crosslinked, more particularly based on (meth)acrylate, are, in particular, acid groups (carboxylic acid, sulphonic acid and/or phosphonic acid groups) and/or hydroxyl groups and/or acid anhydride groups and/or epoxide groups and/or amine groups, selected in particular in line with the respective crosslinker. It is particularly advantageous if the polymer comprises copolymerized acrylic acid and/or methacrylic acid.

It may, however, also be advantageous to do without accelerants, since accelerants, for example, may tend toward yellowing (particularly, for example, nitrogen-containing substances), and this may be disruptive, for example, for transparent polymers and (pressure-sensitive) adhesives for applications in the optical sector. Examples of suitable crosslinkers which manage without additional addition of accelerant and for which accelerants can be dispensed with when they are used include epoxycyclohexyl derivatives; particularly when carboxylic acid groups are present in the polymer to be crosslinked, more particularly based on (meth)acrylate. This may be realized, for example, through at least 5% by weight of copolymerized acrylic acid in the polymer. In the polymer to be crosslinked there are advantageously, in particular, no proton acceptors, no electron-pair donors (Lewis bases) and/or no electron-pair acceptors (Lewis acids) present, and more particularly none added. This absence refers in particular to externally added accelerants (in other words, those which are not copolymerized or incorporated into the polymer framework), but with particular preference neither externally added nor copolymerized accelerants are present, and very preferably none at all.

Having emerged as being particularly advantageous as crosslinkers are epoxycyclohexyl carboxylates, with particular preference (3,4-epoxycyclohexane)methyl 3,4-epoxycyclohexylcarboxylate.

With advantage, using the aforementioned crosslinkers or crosslinker-accelerant systems, or other substances which initiate thermal crosslinking, it is possible to adopt a procedure in which the crosslinking of the polymer to be crosslinked, more particularly of the polyacrylate, is initiated in the melt and the polymer is subsequently cooled at a point in time at which crosslinking has been concluded to an extent of less than 10%. With further preference, initiation takes place in a processing reactor which in particular is one of the mixing assemblies identified below. This may be the mixing assembly in which also the microballoons are added, or else a different mixing assembly. Following the initiation, the polymer to be crosslinked and to be foamed is taken from the processing assembly and foams following its removal, with removal generally being accompanied itself by a drop in temperature. Subsequently, the polymer composition is shaped. Crosslinking then proceeds, as a result of the choice of the crosslinker-accelerant system, after cooling as well, until the final degree of crosslinking has been reached. Preferably the crosslinking reaction proceeds at room temperature, and so cooling takes place to room temperature.

Depending on the field of application and desired properties, further components and/or additives may be added to the polymer composition to be foamed, in each case alone or in combination with one, two or more other additives or components.

In one preferred procedure, particularly for use of the polymer composition to be foamed as a self-adhesive composition, resins, such as tackifier resins and/or thermoplastic resins, for example, are admixed. Resins for the purposes of this specification are considered to be oligomeric and polymeric compounds having a number-average molecular weight $M_n$ of not more than 5000 g/mol. The maximum amount of resin which can be added is limited by the miscibility with the polymers—where appropriate blended with other starting materials; at any rate, a homogeneous mixture should be formed between resin and polymers.

As tackifying resins it is possible to use the tackifier resins that are known in principle to the skilled person. Representatives that may be mentioned include the pinene resins, indene resins, and rosins, their disproportionated, hydrogenated, polymerized, and esterified derivatives and salts, the aliphatic and aromatic hydrocarbon resins, terpene resins and terpene-phenolic resins, and also $C_5$—, $C_9$— and other hydrocarbon resins, in each case alone or in combination with one another. With particular advantage it is possible to use all resins which are compatible with the polymer composition (i.e., soluble therein), and reference may be made more particularly to all aliphatic, aromatic, alkylaromatic hydrocarbon resins, hydrocarbon resins based on pure monomers, hydrogenated hydrocarbon resins, functional hydrocarbon resins, and natural resins. Preferred terpene-phenolic resins are, for example, Dertophene T105 and Dertophene T110; a preferred hydrogenated rosin derivative is Foral 85.

Further, optionally, it is possible to add powder- and granule-form fillers, dyes, and pigments, including, in particular, abrasive and reinforcing types, such as, for example, chalks ($CaCO_3$), titanium dioxides, zinc oxides, and carbon blacks. With preference it is possible to use various forms of chalk as a filler, and Mikrosöhl chalk (from Söhlde) is used with particular preference. At preferred fractions of up to 20% by weight, there is virtually no change in the adhesive properties (shear strength at RT, instantaneous bond strength to steel and PE) as a result of the addition of filler. Likewise with preference it is possible to add various organic fillers.

Suitable additives for the polymer composition of the invention, moreover, selected independently of other additives, are nonexpandable hollow polymer beads, solid polymer beads, hollow glass beads, solid glass beads, hollow ceramic beads, solid ceramic beads and/or solid carbon beads ("carbon microballoons").

Additionally it is possible for low-flammability fillers, such as ammonium polyphosphate, for example, and also electrically conductive fillers, such as conductive carbon black, carbon fibres and/or silver-coated beads, for example, and also ferromagnetic additives, such as iron(III) oxides, for example, and ageing inhibitors, light stabilizers, and ozone protectants, to be added or to be incorporated by compounding.

Optionally the customary plasticizers may be added. Plasticizers which can be metered in include, for example, low molecular weight polyacrylates, phthalates, water-soluble plasticizers, plasticizing resins, phosphates or polyphosphates.

The addition of silicas, advantageously precipitated silica surface-modified with dimethyldichlorosilane, may be utilized in order to set the thermal shear strength of the corresponding polymer layer.

The process of the invention is carried out preferably as follows (cf. FIGS. 1 and 2): the base polymer K is melted and conveyed, in particular by means of a conveying assembly 1, to a mixing assembly 2. In this assembly 2, and optionally in one or more further mixing assemblies 3 (suitable mixing assemblies 2, 3 are, in particular, extruders, such as twin-screw extruders and/or planetary roller extruders), further necessary components and, where appropriate, optional components are mixed in at particular metering points 22, 23, 34, 35, and 36, such as resins, accelerants, crosslinkers, fillers, and the like, and also the microballoons. If necessary, at least one of the mixing assemblies 2, 3 or a further optionally provided assembly (not shown in the figures) is suitable for degassing the polymer melt. This degassing unit is unnecessary, particularly if all of the mixture constituents have already been degassed prior to addition and the further ingress of gas has been avoided. Advantageously there is a vacuum dome V used for generating the subatmospheric pressure which produces degassing. The addition of the microballoons takes place in particular at elevated pressure, in order to suppress premature expansion of the hollow microbeads at the temperature of the polymer melt.

The melt mixture produced in this way is transferred to a die 5. On departure from the die 5, there is a drop in pressure, and so the hollow microbeads following their departure, in other words following the drop in pressure, undergo expansion and ensure the foaming of the polymer composition. The composition foamed in this way is subsequently shaped, more particularly by means of a roll mill 4, such as a roll calender.

The process of the invention is elucidated in more detail below with reference to two figures, without any intention that the teaching according to the invention should be restricted unnecessarily by this exemplary representation. In the figures FIG. 1 shows an apparatus construction particularly useful for implementing the process, and FIG. 2, superimposed on the apparatus set-up dealt with before, shows by way of example the locational assignment of the individual process steps and additionally, in particular, the parameters of temperature and pressure.

The arrangement of the assemblies and process apparatus constituents, especially of the mixing assemblies, is presented by way of example, and can be varied according to the process regime.

FIG. 1

In a first assembly 1, as for example in a conveying assembly such as an extruder (more particularly a single-screw conveying extruder), the base polymer composition K is melted and is conveyed, in particular by means of this conveying assembly 1, as a polymer melt, via a connecting section 11, more particularly a heatable connecting section 11 (for example, a hose or a pipe), into a second assembly 2, more particularly a mixing assembly such as a twin-screw extruder.

Via one or more metering points 22, 23 in the second assembly, it is possible, jointly or separately from one another, for additives to be added to the base polymer melt, such as, for example, all the resins or some of the resins, the crosslinker system or parts thereof (more particularly crosslinker and/or accelerant), fillers, colour pastes or the like.

Prior to departure from the assembly 2, in other words in particular the twin-screw extruder, the polymer melt thus blended is degassed, more particularly via a vacuum dome V at a pressure of 175 mbar or less, and subsequently is conveyed via a second connecting section 24, more particularly a heatable connecting section 24 (for example, a hose or a pipe), into a third assembly 3, more particularly a second mixing assembly, as for example a planetary roller extruder provided with a sliding sealing ring 36.

The third assembly 3, more particularly the planetary roller extruder, has one or more temperature-controllable mixing zones 31, 32 and one or more injection or metering facilities 33 34, 35, for the polymer melt to be introduced and to be blended with further components and/or additives, the latter components and/or additives having, more particularly already been degassed.

Via a metering point 34, for example, a resin or a resin mixture is added. Advantageously the resin or resin mixture has been degassed beforehand in a separate vacuum dome V. Via a metering point 35 (here drawn in only schematically at the same point as 34, although it may well be—and usually is—a different metering point situated at a different point on the extruder), the microballoons embedded into a liquid are added. Via the same metering point or a further metering point, not shown in FIG. 1, the crosslinker system or parts thereof (in particular, as yet missing components of the crosslinker system) may be added. Advantageously, the crosslinker system or parts thereof—more particularly crosslinker and/or accelerant—may be mixed in together with the microballoons, as a microballoon/crosslinker system mixture. In a heating zone 32 (heatable mixing zone), the polymer melt is compounded with the added components and/or additives, but at least the microballoons.

The resultant melt mixture is transferred via a further connecting section or a further conveying unit 37, such as a gear pump, for example, into a die 5. On departure from the die 5, in other words after a pressure drop, the incorporated microballoons undergo expansion, so giving rise to a foamed polymer composition, more particularly a foamed self-adhesive composition, which is subsequently shaped, being shaped, for example, as a web by means of a roll calender 4 (rolls 41, 42, and 43 of the calender; carrier material 44 on to which the polymer layer is deposited).

FIG. 2

Figure 2:
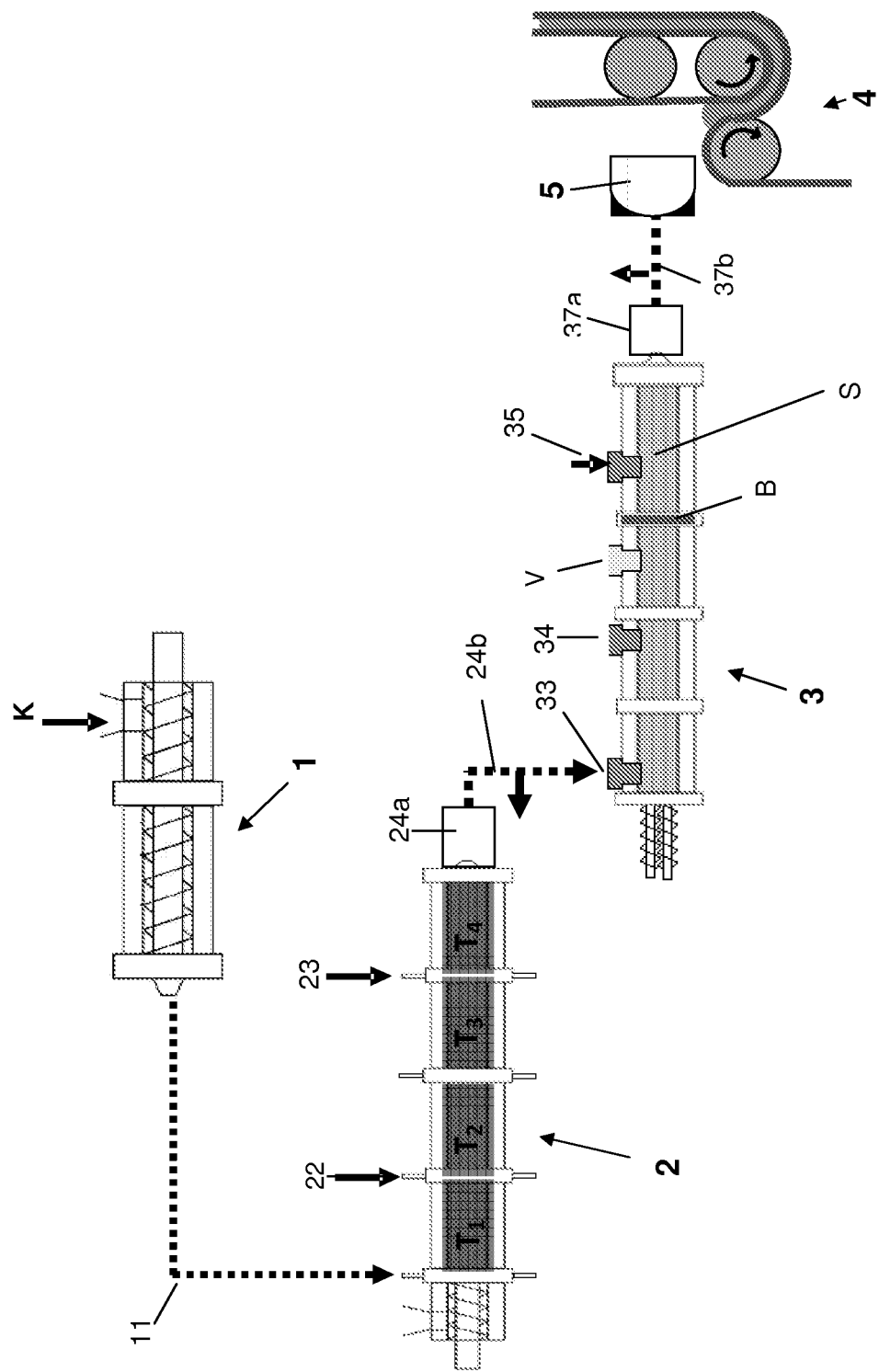
FIG. 2 illustrates the apparatus of FIG. 1, showing the location of individual process steps and the parameters of temperature and pressure.

The base polymer composition K is melted in a first assembly 1, as for example in a conveying assembly such as an extruder (more particularly a single-screw conveying extruder), and with this assembly is conveyed in the form of a polymer melt, via a heatable hose 11 or a similar connecting section (for example, a pipe), into a second assembly 2, as for example a mixing assembly such as a planetary roller extruder. In FIG. 2, by way of example for this, a modular-construction planetary roller extruder is provided which has four modules that can be temperature-controlled independently of one another ($T_1$, $T_2$, $T_3$, $T_4$).

Via the metering port 22 it is possible for further components to be added, here in particular a melted resin or a melted resin mixture (for better miscibility, it may be advantageous to select a high temperature in the segment $T_2$, and preferably in the segment $T_1$ as well). There is also the possibility of supplying additional additives or fillers, such as colour pastes, for example, via further metering ports such as 22 present in the assembly 2 (not drawn in separately). At the metering point 23 it is possible with advantage to add the crosslinker. For this purpose it is advantageous to lower the temperature of the melt, in order to lower the reactivity of the crosslinker and thereby to increase the processing life (temperature in segment $T_4$ low, advantageously low in the segment $T_3$ as well).

By means of a heatable hose 24b or a similar connecting section and a melt pump 24a or another conveying unit, the polymer melt is conveyed into a third assembly 3, such as a further mixing assembly, for example, such as a twin-screw extruder, and is fed into this assembly 3 at position 33. At the metering point 34, for example, the accelerant component is added. The design of the twin-screw extruder is advantageously such that it can be used as a degassing apparatus. Thus, for example, at the point shown, the entire mixture can be freed from all gas inclusions in a vacuum dome V at a pressure of 175 mbar or less. After the vacuum zone on the screw there is a blister B (throttle point in the extrusion chamber, formed in particular as a circulating gap, such as an annular gap, for example, which serves, in particular, for adjusting the pressure of the melt processed in the extruder), which allows a build-up of pressure in the segment S that follows. Through appropriate control of the extruder speed and of the conveying unit downstream of the extruder, such as a melt pump 37a, for example, a pressure of 8 bar or more is built up in the segment S between blister B and melt pump 37a. In this segment S, at a metering point 35, the microballoon mixture (microballoons embedded into a liquid) is introduced, and is incorporated homogeneously into the polymer composition in the extruder.

The resultant melt mixture is transferred by means of the conveying unit (melt pump 37a and a connecting section 37b, such as a hose, for example) into a die 5. On departure from the die 5, in other words after a drop in pressure, the incorporated microballoons undergo expansion, thereby forming a foamed polymer composition, more particularly a foamed self-adhesive composition S, which is subsequently shaped, being shaped, for example, as a web by means of a roll calender 4.

The invention further provides virtually gas-free foamed polymer compositions—in particular in the form of polymer composition layers or in the form of a foamed moulding (any desired shaping)—in which virtually all of the cavities are each lined with their own polymer shell. The polymer composition layers have, in particular, a construction as described in the context of this specification; the mouldings are obtainable, for example, by injection moulding or similar techniques. The polymer composition layers and/or the mouldings are produced more particularly by the process according to the invention.

The products according to the invention are characterized by the extensive absence of open-celled cavities, more particularly of air inclusions, in the foamed polymer compositions within these products. The polymer composition layers and mouldings of the invention advantageously have a fraction of cavities without their own polymer shell, i.e., of open-celled caverns, of not more than 2% by volume, more particularly of not more than 0.5% by volume. Very preferably the polymer composition layers and mouldings of the invention are virtually gas-free. They have, in particular, the densities stated above.

The foamed products according to the invention, such as transfer tapes or three-layer adhesive tapes in particular, find a host of applications, as for example in the construction industry, in the electronics industry, in the home improvement sector, in the auto industry, in ship building, boat construction and railroad construction, for household appliances, furniture, and the like. Advantageous applications are, for example, the adhesive bonding of strips and badges in the aforementioned regions, the adhesive bonding of stiffening profiles in elevators, the adhesive bonding of components and products in the solar industry, frame bonding in electronic consumer goods, such as televisions and the like, and adhesive bonds in sign manufacture.

Experimental Section

Unless specifically indicated otherwise or otherwise apparent, the statements of the values in the context of this specification, and also the sample preparations and measurements, take place in accordance with the following methods and under standard conditions (25° C., 101325 Pa).

I.1 Density Determination by Pycnometer:

The principle of the measurement is based on the displacement of the liquid located within the pycnometer. First, the empty pycnometer or the pycnometer filled with liquid is weighed, and then the body to be measured is placed into the vessel.

The density of the body is calculated from the differences in weight:

Let
$m_0$ be the mass of the empty pycnometer,
$m_1$ be the mass of the pycnometer filled with water,
$m_2$ be the mass of the pycnometer with the solid body,
$m_3$ be the mass of the pycnometer with the solid body, filled up with water,
$\rho_W$ be the density of the water at the corresponding temperature,
$\rho_F$ be the density of the solid body.

The density of the solid body is then given by:

$$\rho_F = \frac{(m_2 - m_0)}{(m_1 - m_0) - (m_3 - m_2)} \cdot \rho_W$$

One triplicate determination is carried out for each specimen. It should be noted that this method gives the unadjusted density (in the case of porous solid bodies, in the present case a foam, the density based on the volume including the pore spaces).

I.2 Quick Method for Density Determination from the Coatweight and the Film Thickness:

The weight per unit volume or density $\rho$ of a coated self-adhesive composition is determined via the ratio of the weight per unit area to the respective film thickness:

$$\rho = \frac{m}{V} = \frac{MA}{d}$$

$$[\rho] = \frac{[kg]}{[m^2] \cdot [m]} = \left[\frac{kg}{m^3}\right]$$

MA=coatweight/weight per unit area (excluding liner weight) in [kg/m$^2$]
d=film thickness (excluding liner thickness) in [m]

This method as well gives the unadjusted density.

This density determination is suitable in particular for determining the total density of finished products, including multi-layer products.

II. Quantitative Determination of Shear Strength: Static Shear Test SST

A rectangular test specimen, measuring 13 mm×20 mm, of the double-sided adhesive tape under test is adhered between two steel plaques (50 mm×25 mm×2 mm; material according to DIN EN 10088-2, type 1, 4301, surface quality 2R, cold-rolled and bright-annealed, Ra 25-75 nm) in such a way that the bond area of the test specimen with both steel plaques is 260 mm$^2$ in each case, the steel plaques being oriented parallel with an offset in the longitudinal direction, so that the test specimen is bonded centrally between them and the steel plaques project beyond the test specimen on different sides. The resultant assembly is subsequently compressed for 1 minute with an applied pressure of 100 N/cm$^2$. After a predetermined peel increase time (unless indicated otherwise, 72 hours at room temperature), the test specimens produced in this way are suspended on a shear test measurement set-up, by one steel plaque region protruding beyond the test specimen, in such a way that the longitudinal direction of the steel plaques points downwards, and the region of the other steel plaque that protrudes beyond the test specimen is loaded, at a predetermined temperature, with a selected weight (measurements at room temperature with a load of 20 N, and at 70° C. with a load of 10 N; see details in the respective table). Test conditions: standard conditions, 50% relative humidity.

An automatic clock then counts the time until the test specimen fails, in minutes (the steel plaque drops off under load).

III. Peel Strength (Bond Strength) BS

A strip of the (self-)adhesive tape under investigation is adhered in a defined width (standard: 20 mm) to a sanded steel plate (stainless steel 302 according to ASTM A 666; 50 mm×125 mm×1.1 mm; bright annealed surface; surface roughness 50±25 nm arithmetic average deviation from the baseline) by being rolled on ten times using a 5 kg steel roller. Double-sidedly adhesive tapes are reinforced on the reverse with an unplasticized PVC film 36 μm thick. Identical samples are produced and are provided alternatively for immediate measurement, stored for 3 days and measured, or stored for 14 days and measured.

The prepared plate is clamped (fixed) into the testing apparatus, and the adhesive strip is peeled from the plate via its free end in a tensile testing machine at a peel angle of 90° and at a speed of 300 mm/min in the longitudinal direction of the adhesive tape. The force necessary for performing this operation is recorded. The results are reported in N/cm (force standardized to the particular section of bond parted) and are averaged over three measurements. All of the measurements are carried out in a controlled-climate chamber at 23° C. and 50% relative humidity.

IV. Dynamic T-Block Test:
—Determination of the Strength of Double-Sided Adhesive Tapes in Z-Direction—

The surfaces (25 mm×25 mm), opposite to the crosspieces, of the foot regions of two T-shaped aluminium profiles are bonded to one another without air bubbles, using the double-sided adhesive tape under test (cut to a square with edge length of 25 mm), and are pressed at 110 N for 15 seconds.

After a peel increase time of 24 hours at room temperature, testing takes place. For the test, the cross-pieces of the adhesive assembly, pointing in each case in the opposite direction, are pulled apart with a tensile testing machine at a speed of 300 mm/min (pulling direction perpendicular to the bonded surfaces), and the maximum force measured in the course of this operation is reported as the result.

V. Dynamic Shearing Force:

The double-sided adhesive tape under test (sample size=25×25 mm) is adhered without bubbles between two steel plates and is pressed at 0.1 kN/cm$^2$ for 1 minute. Immediately and after a peel increase time of 3 days at room temperature, testing takes place. For testing, the sample specimen is pulled part at a speed of 50 mm/min in y-direction, and the maximum force measured during this operation is reported as the result.

VI. Dynamic L-Jig Test
—Determination of the Detachment Force of Double-Sided Adhesive Tape—

One leg of an L-shaped steel sheet angle piece is adhered with the double-sided adhesive tape specimen under measurement (cut to a square, edge length 25 mm) to a smooth, polished ABS test plate (ABS: acrylonitrile-butadiene-styrene copolymer), so that the adhesive-tape side under test is lying on the test plate and the bond area is 25 mm². The bond is subjected to a pressure of 60 N for 5 seconds, using a steel die for reinforcement.

After a peel increase time of 24 hours at room temperature, the steel sheet angle piece is removed from the test plate with a tensile testing machine, at a speed of 200 mm/min, and the maximum force measured during this operation is reported as the result.

VII. Static Glass Transition Temperature Tg

The static glass transition temperature is determined by dynamic differential calorimetry in accordance with DIN 53765. The figures given for the glass transition temperature Tg relate to the glass transition temperature value Tg according to DIN 53765:1994-03, unless indicated otherwise specifically.

VIII. Molecular Weights

The average molecular weight $M_W$ and the polydispersity D were determined by means of gel permeation chromatography (GPC). The eluent used was THF with 0.1% by volume of trifluoroacetic acid. Measurement took place at 25° C. The preliminary column used was PSS-SDV, 5 µm, 103 Å (10-7 m), ID 8.0 mm×50 mm. Separation took place using the columns PSS-SDV, 5 µm, 103 Å (10-7 m), 105 Å (10-5 m) and 106 Å (10-4 m) each with an ID of 8.0 mm×300 mm. The sample concentration was 4 g/l and the flow rate was 1.0 ml per minute. Measurement was carried out against PMMA standards.

IX. Solids Content:

The solids content is a measure of the fraction of unevaporable constituents in a polymer solution. It is determined gravimetrically, with the solution being weighed, then the vaporizable fractions being evaporated off in a drying cabinet at 120° C. for 2 hours, and the residue weighed again.

X. K Value (FIKENTSCHER):

The K value is a measure of the average molecule size in high-polymer compounds. For the measurement, one percent strength (1 g/100 ml) toluenic polymer solutions were prepared, and their kinematic viscosities were determined using a VOGEL-OSSAG viscometer. Following standardization to the viscosity of toluene, the relative viscosity is obtained, and can be used to calculate the K value by the method of FIKENTSCHER (Polymer 8/1967, 381 ff.)

XI. Determination of Surface Roughness

The PRIMOS system is composed of an illumination unit and a recording unit.

Using a digital micro-mirror projector, the illumination unit projects lines on the surface. These projected parallel lines are diverted or modulated by the surface structure.

The modulated lines are recorded using a CCD camera arranged at a particular angle, called the triangulation angle.

Measurement field size: 14.5×23.4 mm²

Profile length: 20.0 mm

Surface roughness: at a distance of 1.0 mm from the edge (Xm=21.4 mm; Ym=12.5 mm)

Filtering: 3rd-order polynomial filter

Measurement devices of this kind can be acquired from companies including GFMesstechnik GmbH of Teltow.

Raw Materials Used:

| Chemical compound | Trade name | Manufacturer | CAS No. |
|---|---|---|---|
| bis(4-tert-Butylcyclohexyl) peroxydicarbonate | Perkadox 16 | Akzo Nobel | 15520-11-3 |
| 2,2'-Azobis(2-methylpropionitrile), AIBN | Vazo 64 | DuPont | 78-67-1 |
| 2,2'-Azobis(2-methylbutyronitrile) | Vazo 67 | DuPont | 13472-08-7 |
| Pentaerythritol tetraglycidyl ether | Polypox R16 Denacol EX-411 | UPPC AG Nagase Chemtex Corp. | 3126-63-4 |
| 3,4-Epoxycyclohexylmethyl 3,4-epoxycyclohexanecarboxylate | Uvacure 1500 | Cytec Industries Inc. | 2386-87-0 |
| Triethylenetetramine | Epikure 925 | Hexion Speciality Chemicals | 112-24-3 |
| Microballoons (MB) (dry-unexpanded microspheres, diameter 9-15 [82 m, expansion start temperature 106-111° C., TMA density ≤ 25 kg/m³) | Expancel 051 DU 40 | Expancel Nobel Industries | |
| Terpene-phenolic resin (softening point 110° C.; $M_w$ = 500-800 g/mol; D = 1.50) | Dertophene T110 | DRT resins | 25359-84-6 |
| Cocoalkylamine ethoxylate | Ethomeen C/25 | Akzo Nobel | 61791-14-8 |
| Resorcinol bis(diphenyl phosphate) | Reofos RDP | Chemtura | 57583-54-7 |
| Aqueous carbon black dispersion (aqueous, solvent-free, organic pigment preparation) | Levanyl Schwarz N-LF (Levanyl Black N-LF) | Lanxess | |
| Acrylic acid n-butyl ester | n-Butyl acrylate | Rohm & Haas | 141-32-2 |
| Acrylic acid | Acrylic acid, pure | BASF | 79-10-7 |
| N-tert-butylacrylannide | | Linz Chemie | 107-58-4 |
| 2-Ethylhexyl acrylate | | Brenntag | 103-11-7 |
| 2-Hydroxyethyl methacrylate | Bisomer HEMA | Cognis | 868-77-9 |
| Methyl acrylate | | BASF | 96-33-3 |
| Maleic anhydride | MSA | Condea-Huntsman | 96-33-3 |

Preparation of Base Polymer Ac 1:

A reactor conventional for radical polymerizations was charged with 54.4 kg of 2-ethylhexyl acrylate, 20.0 kg of methyl acrylate, 5.6 kg of acrylic acid and 53.3 kg of acetone/isopropanol (94:6). After nitrogen gas had been passed through the reactor for 45 minutes, with stirring, the reactor was heated to 58° C. and 40 g of Vazo 67, in solution in 400 g of acetone, were added. Subsequently the external heating bath was heated to 75° C. and the reaction was carried out constantly at this external temperature. After 1 hour a further 40 g of Vazo 67, in solution in 400 g of acetone, were added, and after 4 hours the batch was diluted with 10 kg of acetone/isopropanol mixture (94:6).

After 5 hours and again after 7 hours, 120 g each time of bis(4-tert-butylcyclohexyl) peroxydicarbonate, in solution each time in 400 g of acetone, were added for re-initiation. After a reaction time of 22 hours, the polymerization was discontinued and the batch was cooled to room temperature. The product had a solids content of 55.9% and was dried. The resulting polyacrylate had a K value of 58.8, an average molecular weight of Mw=746 000 g/mol, a polydispersity of D (Mw/Mn)=8.9 and a static glass transition temperature of Tg=−35.6° C.

Preparation of Base Polymer Ac2

A reactor conventional for radical polymerizations was charged with 30.0 kg of 2-ethylhexyl acrylate, 67.0 kg of butyl acrylate, 3.0 kg of acrylic acid and 66.7 kg of acetone/isopropanol (96:4). After nitrogen gas had been passed through the reactor for 45 minutes, with stirring, the reactor was heated to 58° C. and 50 g of Vazo 67, in solution in 500 g of acetone, were added. Subsequently the external heating bath was heated to 70° C. and the reaction was carried out constantly at this external temperature. After 1 hour a further 50 g of Vazo 67, in solution in 500 g of acetone, were added, and after 2 hours the batch was diluted with 10 kg of acetone/isopropanol mixture (94:6). After 5.5 hours, 150 g of bis(4-tert-butylcyclohexyl) peroxydicarbonate, in solution in 500 g of acetone, were added, and after 6 hours 30 minutes the batch was again diluted with 10 kg of acetone/isopropanol mixture (96:4). After 7 hours a further 150 g of bis(4-tert-butylcyclohexyl) peroxydicarbonate, in solution in 500 g of acetone, were added, and the heating bath was set to a temperature of 60° C.

After a reaction time of 22 hours, the polymerization was discontinued and the batch was cooled to room temperature. The product had a solids content of 50.2% and was dried. The resulting polyacrylate had a K value of 75.2, an average molecular weight of Mw=1 370 000 g/mol, a polydispersity of D (Mw/Mn)=17.13 and a static glass transition temperature of Tg=−38.0° C.

Polyacrylate Pressure-Sensitive Adhesive PAPSA:

A 100 L glass reactor conventional for radical polymerizations was charged with 4.8 kg of acrylic acid, 11.6 kg of butyl acrylate, 23.6 kg of 2-ethylhexyl acrylate and 26.7 kg of acetone/benzine 60/95 (1:1). After nitrogen gas had been passed through the reactor for 45 minutes, with stirring, the reactor was heated to 58° C. and 30 g of AIBN was added. Subsequently the external heating bath was heated to 75° C. and the reaction was carried out constantly at this external temperature. After a reaction time of 1 hour a further 30 g of AIBN were added. After 4 hours and again after 8 hours, 10.0 kg each time of acetone/benzine 60/95 (1:1) mixture were added for dilution. For reduction of the residual initiators, 90 g each time of bis(4-tert-butylcyclohexyl) peroxydicarbonate were added after 8 hours and again after 10 hours. After a reaction time of 24 hours, the reaction was discontinued and the batch was cooled to room temperature. The polyacrylate was then blended with 0.2% by weight of Uvacure® 1500, diluted with acetone to a solids content of 30%, and then coated from solution on to a siliconized release film (50 µm polyester) or on to an etched PET film 23 µm thick (coating speed 2.5 m/min, drying tunnel 15 m, temperatures zone 1: 40° C., zone 2: 70° C., zone 3: 95° C., zone 4: 105° C.). The coatweight was 50 g/m².

Preparation of Microballoon Mixtures:

The microballoons are introduced into a container into which a liquid component (dispersant) as indicated in the individual examples has been placed. Stirring takes place in a planetary stirrer mechanism from the company pc-laborsystem, at a pressure of 5 mbar and at a speed of 600 rpm, for 30 minutes.

Production of Foamed Composition:

Foaming takes place in an experimental unit which corresponds to the illustration in FIG. 2.

The corresponding base polymer K (Ac1 or Ac2; see tables) is melted in a feeder extruder 1 (single-screw conveying extruder from the company TROESTER GmbH & Co KG, Germany) and is conveyed by this extruder, in the form of a polymer melt, via a heatable hose 11, into a planetary roller extruder 2 from the company Entex (Bochum) (the planetary roller extruder used was, more particularly, one having four modules $T_1$, $T_2$, $T_3$ and $T_4$ heatable independently of one another). Via the metering port 22, the melted resin is then added. In addition, there exists the possibility of supplying additional additives or fillers, such as colour pastes, for example, via further metering points that are present. At point 23, the crosslinker is added. All of the components are mixed to form a homogeneous polymer melt.

By means of a melt pump 24a and a heatable hose 24b, the polymer melt is transferred to a twin-screw extruder 3 (company Berstorf) (feed position 33). At position 34, the accelerant component is added. Subsequently the mixture as a whole is freed from all of the gas inclusions in a vacuum dome V at a pressure of 175 mbar (for the criterion for freedom from gas, see above). Following the vacuum zone, on the screw, there is a blister B, which allows a build up of pressure in the subsequent segment S. Through appropriate control of the extruder speed and of the melt pump 37a, a pressure of greater than 8 bar is built up in the segment S between blister B and melt pump 37a, and at the metering point 35 the microballoon mixture (microballoons embedded into the dispersant assistant in accordance with the details given for the experimental series) is added, and is incorporated homogeneously into the premix by means of a mixing element. The resultant melt mixture is transferred into a die 5.

Following departure from the die 5, in other words after a drop in pressure, the incorporated microballoons undergo expansion, and the drop in pressure results in a low-shear, more particularly no-shear, cooling of the polymer composition. This produces a foamed self-adhesive composition S, which is subsequently shaped to a web by means of a roll calender 4.

Example

Experimental Series 1: Variation of the Microballoon Amount

Dispersing Assistant Ethomeen C/25

| Sample | | | | A | B | C |
|---|---|---|---|---|---|---|
| Components | Ac 1 | [w-%] | | 68.7 | 67.0 | 65.9 |
| | Dertophene T110 | | | 28.3 | 28.3 | 28.3 |
| | Expancel 051 DU 40 | | | 0.7 | 1.5 | 2.0 |
| | Ethomeen C/25 | | | 0.84 | 1.80 | 2.40 |
| | Levanyl N-LF | | | 0.5 | 0.5 | 0.5 |
| | Polypox R16 | | | 0.139 | 0.139 | 0.139 |
| | Epikure 925 | | | 0.144 | 0.144 | 0.144 |
| | Reofos RDP | | | 0.66 | 0.66 | 0.66 |
| Construction | Thickness | [μm] | | 1092 | 1158 | 1091 |
| | Density (I.2) | [kg/m³] | | 944 | 811 | 770 |
| Performance | SST (II) | RT 20N | [min] | 1665 | 940 | 1016 |
| | | 70° C. 10N | | 31 | 17 | 20 |
| | Peel strength (III) | immediate | [N/cm] | 23.4 A | 19.9 A | 18.3 A |
| | | 3 d | | 38.4 A | 33.9 A | 30.6 A |
| | | 14 d | | 35.1 A | 30.9 A | 29.9 A |
| | Dyn. T-block test (IV) | 24 h RT | [N/cm²] | 131.6 A | 134.1 A | 124.2 A |

Experimental Series 2: Variation of the Resin Amount

Dispersing Assistant Ethomeen C/25

| Sample | | | | C | D | E | F |
|---|---|---|---|---|---|---|---|
| Components | Ac 1 | [w-%] | | 65.9 | 63.1 | 59.1 | 56.1 |
| | Dertophene T110 | | | 28.3 | 31.0 | 35.0 | 38.0 |
| | Expancel 051 DU 40 | | | 2.0 | 2.0 | 2.0 | 2.0 |
| | Ethomeen C/25 | | | 2.45 | 2.45 | 2.45 | 2.45 |
| | Levanyl N-LF | | | 0.5 | 0.5 | 0.5 | 0.5 |
| | Polypox R16 | | | 0.139 | 0.139 | 0.139 | 0.139 |
| | Epikure 925 | | | 0.144 | 0.144 | 0.144 | 0.144 |
| | Reofos RDP | | | 0.66 | 0.66 | 0.66 | 0.66 |
| Construction | Thickness | [μm] | | 1091 | 1109 | 1123 | 1130 |
| | Density (I.2) | [kg/m³] | | 770 | 753 | 744 | 752 |
| Performance | SST (II) | RT 20N | [min] | 1016 | 1275 | 1753 | 3309 |
| | | 70° C. 10N | | 20 | 28 | 39 | 31 |
| | Peel strength (III) | immediate | [N/cm] | 18.3 A | 24.5 A | 31.0 A | 36.5 A |
| | | 3 d | | 30.6 A | 33.4 A | 43.1 A | 48.2 A |
| | | 14 d | | 29.9 A | 35.1 A | 42.7 A | 49.2 A |
| | Dyn. T-block test (IV) | 24 h RT | [N/cm²] | 124.2 A | 123.2 A | 137.2 A | 140.0 A |

Experimental Series 3: Constant Density

Dispersing Assistant Reofos RDP

| Sample | | | | G | H |
|---|---|---|---|---|---|
| Components | Ac 1 | [w.-%] | | 69.6 | 65.9 |
| | Dertophene T110 | | | 28.3 | 28.3 |
| | Expancel 051 DU 40 | | | 0.7 | 2.0 |
| | Levanyl N-LF | | | 0.5 | 0.5 |
| | Polypox R16 | | | 0.139 | 0.139 |
| | Epikure 925 | | | 0.144 | 0.144 |
| | Reofos RDP | | | 0.66 | 0.66 |
| Construction | Thickness | [μm] | | 1105 | 1100 |
| | Density (I.2) | [kg/m³] | | 780 | 775 |
| Performance | SST (II) | RT 20N | [min] | 468 | 347 |
| | | 70° C. 10N | | 47 | 53 |
| | Peel strength (III) | immediate | [N/cm] | 19.0 A | 17.3 A |
| | | 3d | | 34.2 A | 29.7 A |
| | Dyn. L-jig test (VI) | 24 h RT | [N/cm] | 114.2 | 116.3 |
| | Dyn. T-block test (IV) | 24 h RT | [N/cm²] | 95.3 A | 123.5 A |
| | Dyn. shearing force (V) | immediate | [N/cm²] | 77.4 | 91.2 |
| | | 3d | | 88.3 | 108.4 |

Experimental Series 4: Constant Density

Dispersing Assistant Ethomeen C/25 and/or Reofoss RDP

| Sample | | | | G | C |
|---|---|---|---|---|---|
| Components | Ac 1 | [w-%] | | 69.6 | 65.9 |
| | Dertophene T110 | | | 28.3 | 28.3 |
| | Expancel 051 DU 40 | | | 0.7 | 2.0 |

-continued

| Sample | | | | G | C |
|---|---|---|---|---|---|
| | Ethomeen C/25 | | | — | 2.40 |
| | Levanyl N-LF | | | 0.5 | 0.5 |
| | Polypox R16 | | | 0.139 | 0.139 |
| | Epikure 925 | | | 0.144 | 0.144 |
| | Reofos RDP | | | 0.66 | 0.66 |
| Construction | Thickness | | [μm] | 1105 | 1091 |
| | Density (I.2) | | [kg/m$^3$] | 780 | 770 |
| Performance | SST (II) | RT 20N | [min] | 468 | 347 |
| | | 70° C. 10N | | 47 | 53 |
| | Peel strength (III) | immediate | [N/cm] | 19.0 A | 18.3 A |
| | | 3d | | 34.2 A | 30.6 A |
| | Dyn. L-jig test (VI) | 24 h RT | [N/cm] | 114.2 | 116.3 |
| | Dyn. T-block test (IV) | 24 h RT | [N/cm$^2$] | 95.3 A | 124.2 A |
| | Dyn. shearing force (V) | immediate | [N/cm$^2$] | 77.4 | 91.2 |
| | | 3d | | 88.3 | 108.4 |

Experimental Series 5

Dispersing Assistant Levanyl N-LF

The polyacrylate pressure-sensitive adhesive PAPSA is laminated on to both sides of the specimens prior to measurement

| Sample | | | | I |
|---|---|---|---|---|
| Components | Ac 2 | | [w-%] | 94.4 |
| | Expancel 051 DU 40 | | | 2.0 |
| | Levanyl N-LF | | | 2.76 |
| | Polypox R16 | | | 0.222 |
| | Epikure 925 | | | 0.144 |
| | Reofos RDP | | | 0.48 |
| Construction | Thickness | | [μm] | 1734 |
| | Density (I.2) | | [kg/m$^3$] | 680 |
| Performance | SST (II) | RT 10N | [min] | 3147 |
| | | 70° C. 5N | | 2954 |
| | Peel strength (III) | immediate | [N/cm] | 21.0 A |
| | | 3d | | 64.3 K |
| | Dyn. T-block test (IV) | 24 h RT | [N/cm$^2$] | 47.0 A |

Experimental Series 6

Dispersing Assistant Ethomeen C/25

The polyacrylate pressure-sensitive adhesive PAPSA is laminated on to both sides of the specimens prior to measurement

| Sample | | | | J | K | L |
|---|---|---|---|---|---|---|
| Components | Ac 2 | | [w-%] | 93.7 | 91.4 | 86.9 |
| | Expancel 051 DU 40 | | | 2.0 | 3.0 | 5.0 |
| | Ethomeen C/25 | | | 2.45 | 3.67 | 6.11 |
| | Levanyl N-LF | | | 1.0 | 1.1 | 1.1 |
| | Polypox R16 | | | 0.222 | 0.222 | 0.222 |
| | Epikure 925 | | | 0.144 | 0.144 | 0.144 |
| | Reofos RDP | | | 0.48 | 0.48 | 0.48 |
| Construction | Thickness | | [μm] | 1030 | 1030 | 870 |
| | Density (I.2) | | [kg/m$^3$] | 828 | 740 | 654 |
| Performance | SST (II) | RT 10N | [min] | 3074 | 4273 | 3162 |
| | | 70° C. 5N | | 1277 | 589 | 263 |
| | Peel strength (III) | immediate | [N/cm] | 17.0 A | 17.8 A | 18.2 A |
| | | 3 d | | 35.4 A | 30.6 A | 26.1 A |
| | | 14 d | | 35.0 A | 33.4 A | 28.5 A |
| | Dyn. T-block test (IV) | 24 h RT | [N/cm$^2$] | 52.2 A | 43.1 A | 38.6 A |

The experimental series above demonstrate the outstanding properties of the products produced in accordance with the invention.

Figure 3:
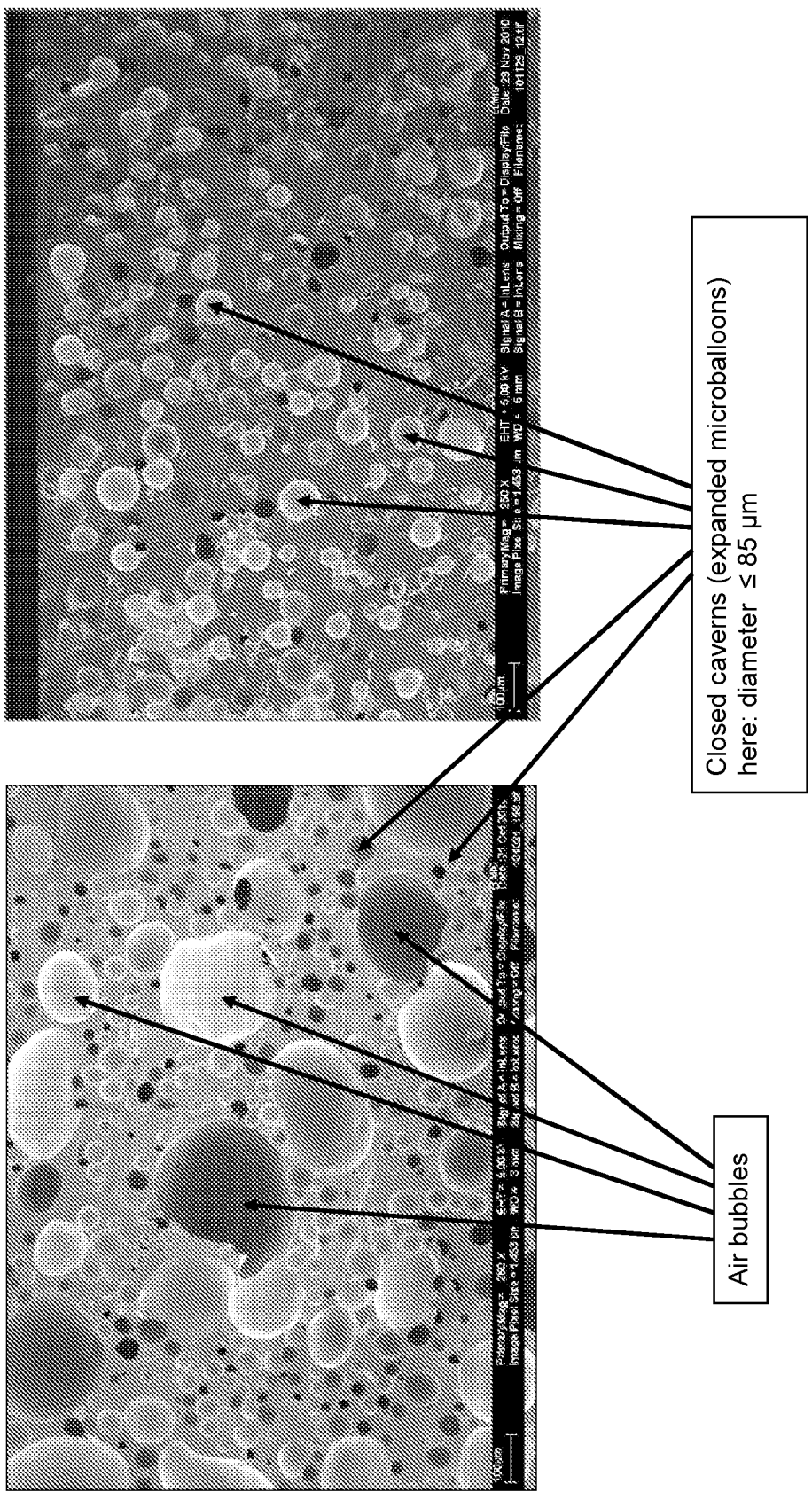
FIG. 3 is a scanning electron micrograph, showing a section through a commercial product foamed with microballoons (left) and a section through a product produced in accordance with the invention (right)

FIG. 3, in a scanning electron micrograph, shows a section through a commercial product foamed with microballoons (left) and also a section through a product produced in accordance with the invention (right) as per Example G. It is apparent that the product according to the invention has exclusively caverns comprising expanded microballoons. The size distribution of the caverns is narrow. The black areas are caverns that were cut open when the section was produced, and microballoons torn from the surface. The colour of the microballoons is based on their position in the polymer matrix.

From the commercial comparative example it is apparent that, in addition to the microballoon caverns, there are other caverns that occur, generally larger and less regularly shaped, to a considerable extent. These are included air bubbles.

LIST OF REFERENCE SYMBOLS

1 first assembly (conveying assembly), e.g. single-screw extruder
11 heatable connecting section, e.g. hose or pipe
2 second assembly (mixing assembly), e.g. twin-screw extruder or planetary roller extruder
21 temperature-controllable mixing zone
22 feed port
23 metering port
24 conveying apparatus
24a conveying unit, more particularly melt pump
24b heatable connecting section, e.g. hose or pipe
3 third assembly (mixing assembly), e.g. twin-screw extruder or planetary roller extruder
31 temperature-controllable mixing zone
32 temperature-controllable mixing zone/heating zone
33 feed port
34, 35 metering port
36 sliding sealing ring
37 conveying apparatus
37a conveying unit, more particularly melt pump
37b heatable connecting section, e.g. hose or pipe
4 roll mill, e.g. roll calender
41, 42, 42 rolls of the roll mill
44 carrier material
$T_1, T_2, T_3, T_4$ mixing assembly modules temperature-controllable independently of one another
B throttle point, more particularly blister S mixing assembly segment for introduction of microballoons
V vacuum dome
5 die

The invention claimed is:

1. Process for preparing a foamable polymer composition using expandable microballoons, which comprises providing a first component, comprising a melt of a polymer or polymers but no expandable microballoons, and a virtually gas free second component, comprising expandable microballoons dispersed without gas bubbles in a liquid which does not produce gas during said process, mixing and degassing said first component to form a first premix, said first premix being at a temperature which would be sufficient to initiate expansion of said expandable microballoons if at atmospheric pressure, and merging said second component with said first premix at a pressure high enough to prevent expansion of said expandable microballoons.

2. Process according to claim 1, wherein, following the merging of the first premix with the second component, expansion of the expandable microballoons is suppressed by maintaining an elevated pressure which is maintained at least until a homogeneous mixture is achieved.

3. Process according to claim 1, wherein the merging of the first premix with the second component takes place in a mixing apparatus where a combination of pressure and temperature sufficient to suppress expansion of the microballoons is maintained until departure from the mixing apparatus, so that the expansion of the microballoons begins only on departure from the mixing apparatus.

4. Process according to claim 1, wherein, in the second component, in addition to the expandable microballoons, further starting materials are suspended in the liquid.

5. Process according to claim 1, wherein the polymer or polymers included in the first component is or are predominantly polyacrylates, polyolefins, natural rubbers and/or synthetic rubbers, whose weight-average molecular weight $M_w$ is more than 500 000 g/mol.

6. Process for foaming a foamable polymer composition following preparation of the foamable polymer composition by the process of claim 1, wherein expansion of the microballoons takes place after merging of the first premix with the second component.

7. Process according to claim 6, wherein, after expansion of the microballoons has taken place, the polymer composition is shaped to a layer in a roll mill.

8. Process according to claim 6, wherein the polymer composition is crosslinked predominantly only after the expansion.

9. Process according to claim 8, wherein the crosslinking is achieved by means of thermally activatable crosslinkers, with avoidance of application of UV rays and/or electron beams.

10. Process according to claim 9, wherein the thermally activatable crosslinkers are isocyanates, epoxides in conjunction with amine accelerants, and/or epoxidized cyclohexyl derivatives.

11. Process according to claim 6, wherein a permanently tacky, foamed and virtually gas-free polymer composition is prepared thereby.

12. Foamed polymer composition comprising expanded microballoons, obtained according to claim 6, wherein the fraction of caverns without their own polymer shell is not more than 2% by volume.

13. Process of claim 7, wherein the polymer composition is crosslinked predominantly only after the shaping to a layer.

14. Process of claim 13, wherein the crosslinking is achieved by means of thermally activatable crosslinkers, with avoidance of application of UV rays and/or electron beams.

15. Process according to claim 14, wherein the thermally activatable crosslinkers are isocyanates, epoxides in conjunction with amine accelerants, and/or epoxidized cyclohexyl derivatives.

* * * * *